United States Patent [19]

Egbers et al.

[11] Patent Number: 5,090,304

[45] Date of Patent: Feb. 25, 1992

[54] APPARATUS FOR DETERMINING THE POSITION OF A MOVEABLE STRUCTURE ALONG A TRACK

[75] Inventors: David A. Egbers, Arlington Heights; Steven D. Jacob, Roselle, both of Ill.

[73] Assignee: Landis & Gyr Powers, Inc., Buffalo Grove, Ill.

[21] Appl. No.: 591,102

[22] Filed: Sep. 28, 1990

[51] Int. Cl.$^5$ ............................................. B08B 15/02
[52] U.S. Cl. ........................................................ 454/59
[58] Field of Search ......................................... 98/115.3

[56] References Cited

U.S. PATENT DOCUMENTS 4,893,551  1/1990  Sharp et al. ........................ 98/115.3

FOREIGN PATENT DOCUMENTS 1122296  1/1962  Fed. Rep. of Germany ..... 98/115.3
2072331  9/1981  United Kingdom ............... 98/115.3
2076145  11/1981  United Kingdom ............... 98/115.3

Primary Examiner—Harold Joyce
Attorney, Agent, or Firm—Welsh & Katz, Ltd.

[57] ABSTRACT

A sensing means for determining the absolute position of one or more structures such as doors, windows or the like that are moveable in sets of tracks. Apparatus comprises an electrical switching means having an elongated electrical resistance means with a predetermined resistance value per unit length located adjacent to one of the sash doors, actuator means associated with the sash doors for operating said switching means, circuit means adapted to provide a substantially constant electrical current through a portion of said resistance means between an end portion of said resistance means and the nearest switch location, said circuit means thereby providing a voltage signal having a magnitude that is proportional to the distance between said end portion of said resistance means and the switch location.

17 Claims, 2 Drawing Sheets

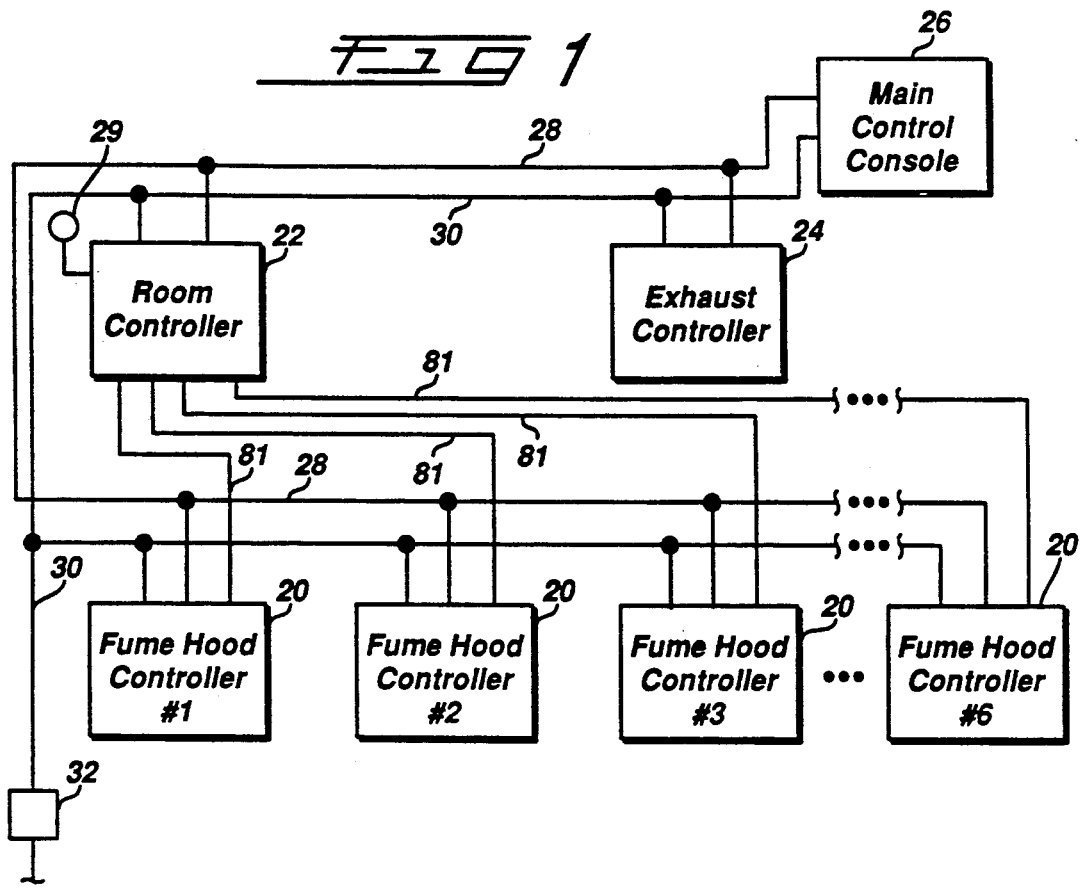
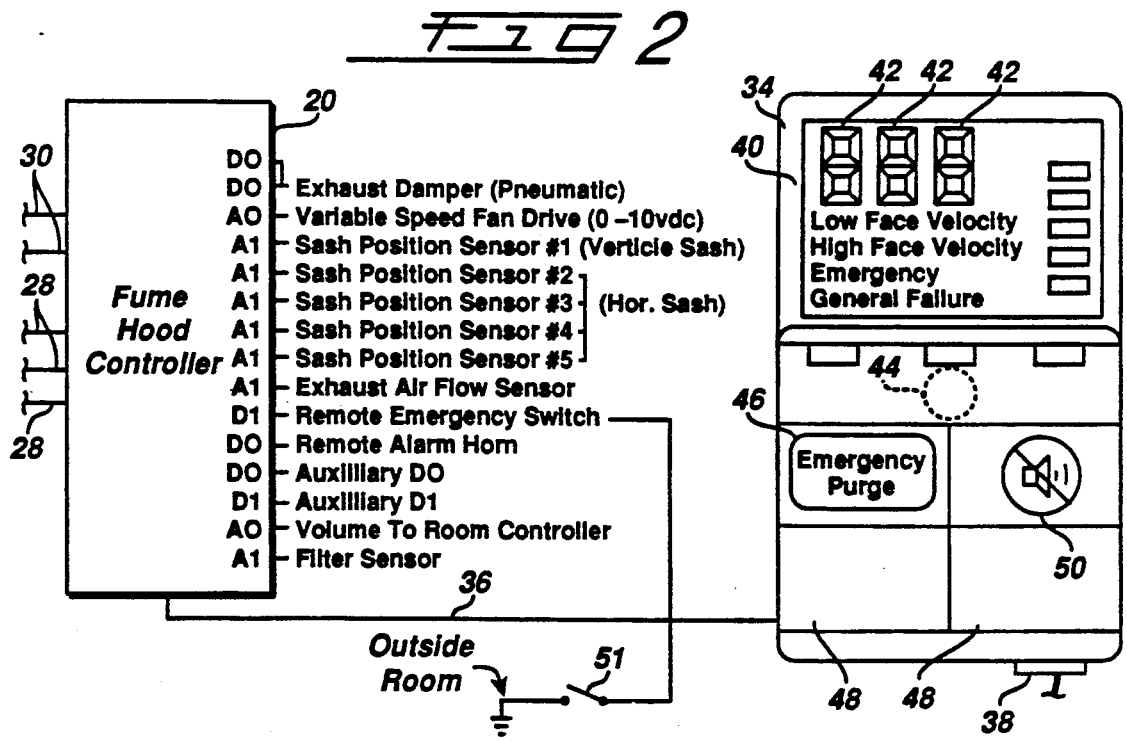

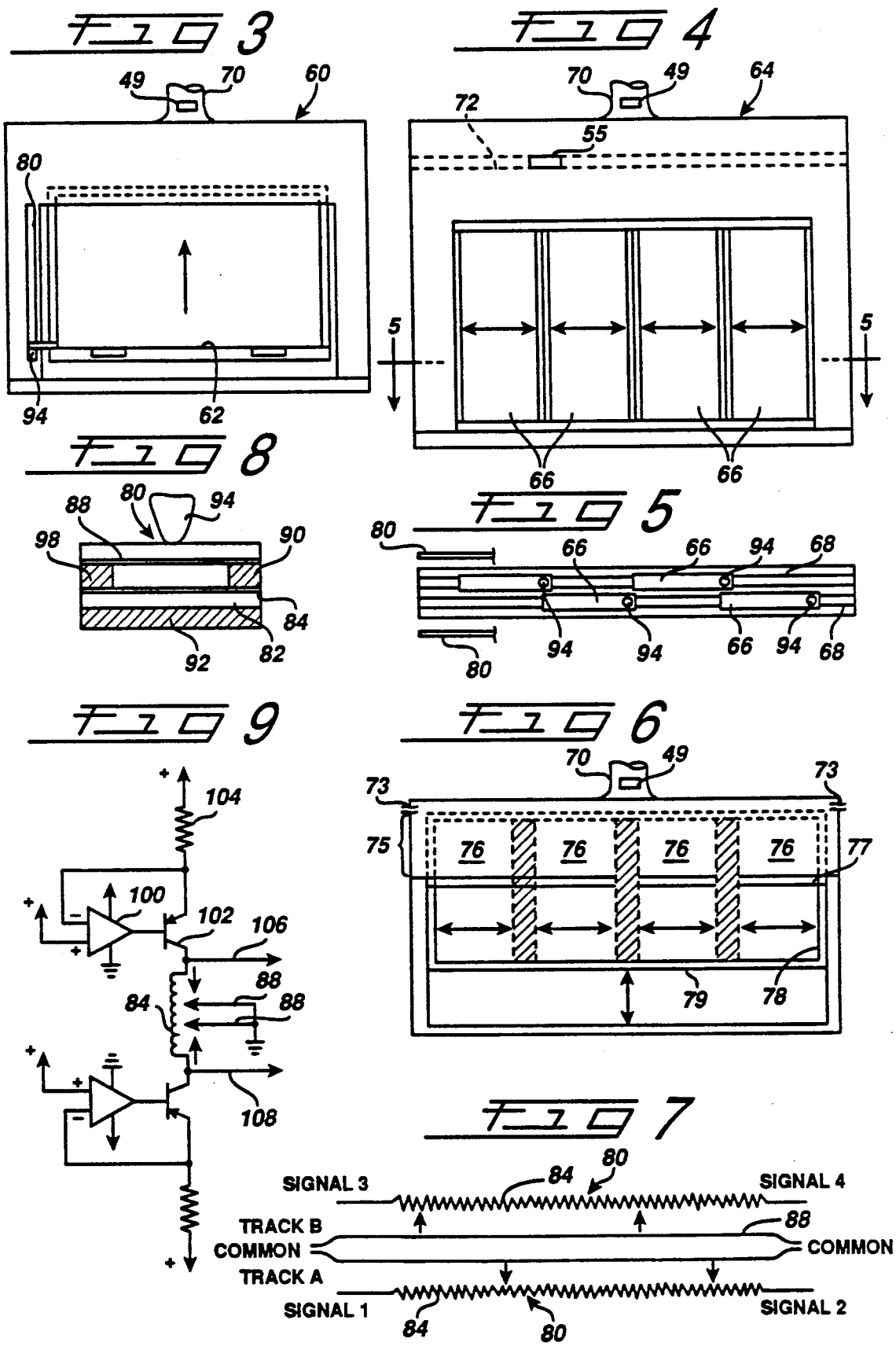

APPARATUS FOR DETERMINING THE POSITION OF A MOVEABLE STRUCTURE ALONG A TRACK

CROSS REFERENCE TO RELATED APPLICATION

| 1. Title: | Apparatus for Controlling the Ventilation of Laboratory Fume Hoods |
|---|---|
| Inventors: | Osman Ahmed, Steve Bradley, Steve Fritsche and Steve Jacob |
| Serial No.: | 590,195 |
| 2. Title: | A System for Controlling the Differential Pressure of a Room Having Laboratory Fume Hoods |
| Inventors: | Osman Ahmed and Steve Bradley |
| Serial No.: | 589,931 |
| 3. Title: | A Method and Apparatus for Determining the Uncovered Size of an Opening Adapted to be Covered by Multiple Moveable Doors |
| Inventors: | Osman Ahmed, Steve Bradley and Steve Fritsche |
| Serial No.: | 590,194 |
| 4. Title: | Laboratory Fume Hood Control Apparatus Having Improved Safety Considerations |
| Inventors: | Osman Ahmed |
| Serial No.: | 589,952 |

The present invention generally relates to an apparatus which determines the position of one or more structures such as sliding doors or windows mounted in tracks, and more particularly relates to determining the position of one or more sash doors that are moveable in associated tracks of a laboratory fume hood.

Fume hoods are utilized in various laboratory environments for providing a work place where potentially dangerous chemicals are used, with the hoods comprising an enclosure having moveable doors at the front portion thereof which can be opened in various amounts to permit a person to gain access to the interior of the enclosure for the purpose of conducting experiments and the like. The enclosure is typically connected to an exhaust system for removing any noxious fumes so that the person will not be exposed to them while performing work in the hood.

Fume hood controllers which control the flow of air through the fume hood have become more sophisticated in recent years, and are now able to more accurately maintain the desired flow characteristics to efficiently exhaust the fumes from the enclosure as a function of the desired average face velocity of the opening of the fume hood. The average face velocity is generally defined as the flow of air into the fume hood per square foot of open face area of the fume hood, with the size of the open face area being dependent upon the position of one or more moveable sash doors that are provided on the front of the enclosure or fume hood, and in most types of enclosures, the amount of bypass opening that is provided when the door or doors are closed.

The fume hoods are exhausted by an exhaust system that generally include a blower that is capable of being driven at variable speeds to increase or decrease the flow of air from the fume hood to compensate for the varying size of the opening or face. Alternatively, there may be a single blower connected to the exhaust manifold that is in turn connected to the individual ducts of multiple fume hoods, and dampers may be provided in the individual ducts to control the flow from the individual ducts to thereby modulate the flow to maintain the desired average face velocity. There may also be a combination of both of the above described systems.

The doors of such fume hoods can be opened by raising them vertically, often referred to as the sash position, or some fume hoods have a number of doors that are mounted for sliding movement in typically two sets of tracks. There are even doors that can be moved horizontally and vertically, with the tracks being mounted in a frame assembly that is vertically moveable.

Prior art fume hood controllers have included sensing means for measuring the absolute position of vertical doors or the relative positions of horizontal doors and then using a signal proportional to the sensed position to thereby vary the speed of the blowers or to vary the position of the dampers.

It is a primary object of the present invention to provide an improved sensing means for measuring the absolute position of moveable structures along a track.

Another object is to provide an improved sensing means for determining the absolute position of sash doors in a laboratory fume hood, wherein there may be one or several sash doors that are moveable along sets of tracks.

A related object is to provide such an improved sensing means that is universally adapted to provide absolute position indicating signals for doors that are moveable in either the vertical or horizontal direction.

Another object is to provide such an improved sensing means that is adapted to provide a single elongated switching means that can be placed along the track in which one or two sash doors are moveable, and wherein separate signals are generated that are indicative of the absolute position of each of the one or two doors.

Yet another object of the present invention is to provide such an improved sensing means that provides such separate signals that are indicative of the absolute position of each of two doors that are moveable in a single set of tracks, and which sensing means is sufficiently small in cross section and simple in its construction that it can be unobtrusively placed in the track without interfering with the movement of the sash doors.

These and other objects will become apparent upon reading the following detailed description of the present invention, while referring to the attached drawings, in which:

FIG. 1 is a schematic block diagram of apparatus of the present invention shown integrated with a room controller of a heating, ventilating and air conditioning monitoring and control system of a building;

FIG. 2 is a block diagram of a fume hood controller, shown connected to an operator panel, the latter being shown in front elevation;

FIG. 3 is a diagrammatic elevation of the front of a representative fume hood having vertically operable sash doors;

FIG. 4 is a diagrammatic elevation of the front of a representative fume hood having horizontally operable sash doors;

FIG. 5 is a cross section taken generally along the line 5—5 of FIG. 4;

FIG. 6 is a diagrammatic elevation of the front of a representative combination sash fume hood having horizontally and vertically operable sash doors;

FIG. 7 is an electrical schematic diagram of a plurality of door sash position indicating switching means;

FIG. 8 is a cross section of the door sash position switching means; and,

FIG. 9 is a schematic diagram of electrical circuitry for determining the position of sash doors of a fume hood.

DETAILED DESCRIPTION

It should be generally understood that a fume hood controller controls the flow of air through the fume hood in a manner whereby the effective size of the total opening to the fume hood, including the portion of the opening that is not covered by one or more sash doors will have a relatively constant average face velocity of air moving into the fume hood. This means that regardless of the area of the uncovered opening, an average volume of air per unit of surface area of the uncovered portion will be moved into the fume hood. This protects the persons in the laboratory from being exposed to noxious fumes or the like because air is always flowing into the fume hood, and out of the exhaust duct, and the flow is preferably controlled at a predetermined rate of approximately 75 to 125 cubic feet per minute per square feet of effective surface area of the uncovered opening. In other words, if the sash door or doors are moved to the maximum open position whereby an operator has the maximum access to the inside of the fume hood for conducting experiments or the like, then the flow of air will most likely have to be increased to maintain the average face velocity at the predetermined desired level. The capabilities and effectiveness of various controllers of the prior art varies considerably.

Broadly stated, the present invention is directed to a sensing means that is adapted to determine the absolute position of one or more structures such as doors, windows or the like that are moveable in sets of tracks. The invention is not limited to doors or windows, however, inasmuch as the sensing means may be used with many types of structures that are moveable along a predetermined path. However, the present invention is particularly adapted for use with laboratory fume hoods of the type which have a controller for accurately controlling the flow of air through the fume hood to maintain an average face velocity of air moving into the fume hood, which is a function of the size or area of the openings, which in turn is in part a function of the positions of the sash doors of the fume hood. Since it is highly desirable for fume hood controller apparatus to provide extremely rapid and effective control of the average face velocity of the fume hood, and to achieve and maintain the desired average face velocity within a few seconds after one or more doors which cover the front opening of the fume hood have been moved, it is necessary that the position of the doors be rapidly and accurately determined, and to that end, the present invention provides generally continuous voltage signals that are input to a fume hood controller, which uses the signals to control the flow of air into and out of the fume hood.

Turning now to the drawings, and particularly FIG. 1, a block diagram is shown of several fume hood controllers 20 interconnected with a room controller 22, an exhaust controller 24 that may be part of the room controller itself and a main control console 26. The fume hood controllers 20 are interconnected with the room controller 22 and with the exhaust controller 24 and the main control console 26 in a local area network illustrated by line 28 which may be a multiconductor cable or the like. The room controller, the exhaust controller 24 and the main control console 26 are typically part of the building main HVAC system in which the laboratory rooms containing the fume hoods are located. The fume hood controllers 20 are provided with power through line 30, which is at the proper voltage via a transformer 32 or the like.

Referring to FIG. 2, a fume hood controller 20 is illustrated with its input and output connector ports being identified, and the fume hood controller 20 is connected to an operator panel 34. It should be understood that each fume hood will have a fume hood controller 20 and that an operator panel will be provided with each fume hood controller. The operator panel 34 is provided for each of the fume hoods and it is interconnected with the fume hood controller 20 by a line 36 which preferably comprises a multi-conductor cable having eight conductors. The operator panel has a connector 38, such as a 6 wire RJ111 type telephone jack for example, into which a lap top personal computer or the like may be connected for the purpose of inputting information relating to the configuration or operation of the fume hood during initial installation, or to change certain operating parameters if necessary. The operator panel 34 is preferably mounted to the fume hood in a convenient location adapted to be easily observed by a person who is working with the fume hood.

The fume hood controller operator panel 34 includes a liquid crystal display 40 which when selectively activated provides the visual indication of various aspects of the operation of the fume hood, including three digits 42 which provide the average face velocity. The display 40 illustrates other conditions such as low face velocity, high face velocity and emergency condition and an indication of controller failure. The operator panel may have an alarm 44, an emergency purge pushbutton 46 which an operator can press to purge the fume hood in the event of an accident. The operator panel has two auxiliary switches 48 which can be used for various customer needs, including day/night modes of operation. It is contemplated that night time mode of operation would have a different and preferably reduced average face velocity, presumably because no one would be working in the area and such a lower average face velocity would conserve energy. An alarm silence switch 50 is also preferably provided.

Fume hoods come in many different styles, sizes and configurations, including those which have a single sash door or a number of sash doors, with the sash doors being moveable vertically, horizontally or in both directions. Additionally, various fume hoods have different amounts of by-pass flow, i.e., the amount of flow permitting opening that exists even when all of the sash doors are as completely closed as their design permits.

Referring to FIG. 3, there is shown a fume hood, indicated generally at 60, which has a vertically operated sash door 62 which can be moved to gain access to the fume hood and which can be moved to the substantially closed position as shown. Some types of fume hoods have a bypass opening that is located above the door sash while others are below the same. In some fume hoods, the first amount of movement of a sash door will increase the opening at the bottom of the door shown in FIG. 3, for example, but as the door is raised, it will merely cut off the bypass opening so that the effective size of the total opening of the fume hood is maintained relatively constant for perhaps the first one-fourth amount of movement of the sash door 62 through its course of travel.

Other types of fume hoods may include several horizontally moveable sash doors 66 such as shown in FIGS. 4 and 5, with the doors being movable in upper and lower pairs of adjacent tracks 68. When the doors are positioned as shown in FIGS. 4 and 5, the fume hood opening is completely closed and an operator may move the doors in the horizontal direction to gain access to the fume hood. Both of the fumes hoods 60 and 64 have an exhaust duct 70 which generally extends to an exhaust system which may be that of the HVAC apparatus previously described. The fume hood 64 also includes a filtering structure shown diagrammatically at 72 which filtering structure is intended to keep noxious fumes and other contaminants from exiting the fume hood into the exhaust system. Referring to FIG. 6, there is shown a combination fume hood which has horizontally movable doors 76 which are similar to the doors 66, with the fume hood 74 having a frame structure 78 which carries the doors 76 in suitable tracks and the frame structure 78 is also vertically movable in the opening of the fume hood.

The illustration of FIG. 6 has portions removed as shown by the break lines 73 which is intended to illustrate that the height of the fume hood may be greater than is otherwise shown so that the frame structure 78 may be raised sufficiently to permit adequate access to the interior of the fume hood by a person. There is generally a by-pass area which is identified as the vertical area 75, and there is typically a top lip portion 77 which may be approximately 2 inches wide. This dimension is preferably defined so that its effect on the calculation of the open face area can be taken into consideration While not specifically illustrated, other combinations are also possible, including multiple sets of vertically moveable sash doors positioned adjacent one another along the width of the fume hood opening, with two or more sash doors being vertically moveable in adjacent tracks, much the same as residential casement windows.

The fume hood controller is adapted to control virtually any of the various kinds and styles of fume hoods that are commercially available, and to this end, it has a number of input and output ports (lines, connectors or connections, all considered to be equivalent for the purposes of describing the present invention) that can be connected to various sensors that may be used with the controller. As shown in FIG. 2, there are five sash position sensor ports for use in sensing the position of both horizontally and vertically movable sashes.

To determine the position of the sash doors, a sash position sensing means embodying the present invention is provided adjacent each movable sash door and is generally illustrated in FIGS. 7, 8 and 9. Referring to FIG. 8, the door sash position sensing means comprises an elongated switch mechanism 80 of relatively simple mechanical design which preferably consists of a relatively thin polyester base layer 82 upon which is printed a strip of electrically resistive ink 84 of a known constant resistance per unit length. Another polyester base layer 86 is provided and it has a strip of electrically conductive ink 88 printed on it. The two base layers 82 and 86 are adhesively bonded to one another by two beads of adhesive 90 located on opposite sides of the strip. The base layers are preferably approximately five-thousandths of an inch thick and the beads are approximately twothousandths of an inch thick, with the beads providing a spaced area between the conductive and resistive layers 88 and 84. The switching mechanism 80 is preferably applied to the fume hood by a layer of adhesive 92.

The polyester material is sufficiently flexible to enable one layer to be moved toward the other so that contact is made in response to a preferably spring biased actuator 94 carried by the appropriate sash door to which the strip is placed adjacent to so that when the sash door is moved, the actuator 94 moves along the switching mechanism 80 and provides contact between the resistive and conductive layers which are then sensed by electrical circuitry to be described which provides a voltage output that is indicative of the position of the actuator 94 along the length of the switching means. Stated in other words, the actuator 94 is carried by the door and therefore provides an electrical voltage that is indicative of the position of the sash door.

The actuator 94 is preferably spring biased toward the switching mechanism 80 so that as the door is moved, sufficient pressure is applied to the switching means to bring the two base layers together so that the resistive and conductive layers make electrical contact with one another and if this is done, the voltage level is provided By having the switching means 80 of sufficient length so that the full extent of the travel of the sash door is provided as shown in FIG. 3, then an accurate determination of the absolute sash position can be made.

It should be understood that the illustration of the switching mechanism 80 in FIGS. 3 and 5 is intended to be diagrammatic, in that the switching mechanism is preferably actually located within the sash frame itself and accordingly would not be visible as shown. The width and thickness dimensions of the switching mechanism are so small that interference with the operation of the sash door is virtually no problem. The actuator 94 can also be placed in a small hole that may be drilled in the sash door or it may be attached externally at one end thereof so that it can be in position to operate the switch 80. In the vertical moveable sash doors shown in FIGS. 3 and 6, a switching mechanism 80 is preferably provided in one or the other of the sides of the sash frame, whereas in the fume hoods having horizontally movable doors, it is preferred that the switching mechanism 80 be placed in the top of the tracks 68 so that the weight of the movable doors do not operate the switching mechanism 80 or otherwise damage the same. It is also preferred that the actuator 94 be located at one end of each of the doors for reasons that are described in the cross-referenced application entitled A method and apparatus for determining the uncovered size of an opening adapted to be covered by multiple moveable doors by Ahmed et al., Ser. No. 590,194.

Turning to FIG. 9, the preferred electrical circuitry which generates the position indicating voltage is illustrated, and this circuitry is adapted to provide two separate voltages indicating the position of two sash doors in a single track. With respect to the cross-section shown in FIG. 5, there are two horizontal tracks, each of which carries two sash doors and a switching mechanism 80 is provided for each of the tracks as is a circuit as shown in FIG. 9, thereby providing a distinct voltage for each of the four sash doors as shown.

The switching means is preferably applied to the fume hood with a layer of adhesive 92 and the actuator 94 is adapted to bear upon the switching means at locations along the length thereof. Referring to FIG. 7, a diagrammatic illustration of a pair of switching means is illustrated such as may occur with respect to the two tracks shown in FIG. 5. A switching mechanism 80 is provided with each track and the four arrows illustrated represent the point of contact created by the actuators 94 which result in a signal being applied on each of the ends of each switching means, with the magnitude of the signal representing a voltage that is proportional to the distance between the end and the nearest arrow. Thus, a single switching mechanism 80 is adapted to provide position indicating signals for two doors located in each track. The circuitry that is used to accomplish the voltage generation is shown in FIG. 9 and includes one of these circuits for each track. The resistive element is shown at 84 and the conductive element 88 is also illustrated being connected to ground with two arrows being illustrated, and represented the point of contact between the resistive and conductive elements caused by each of the actuators 94 associated with the two separate doors. The circuitry includes an operational amplifier 100 which has its output connected to the base of a PNP transistor 102, the emitter of which is connected to a source of positive voltage through resistor 104 into the negative input of the operational amplifier, the positive input of which is also connected to a source of positive voltage of preferably approximately five volts. The collector of the transistor 102 is connected to one end of the resistive element 84 and has an output line 106 on which the voltage is produced that is indicative of the position of the door.

The circuit operates to provide a constant current directed into the resistive element 84 and this current results in a voltage on line 106 that is proportional to the resistance value between the collector and ground which changes as the nearest point of contact along the resistance changes. The operational amplifier operates to attempt to drive the negative input to equal the voltage level on the positive input and this results in the current applied at the output of the operational amplifier varying in direct proportion to the effective length of the resistance strip 84. The lower portion of the circuitry operates the same way as that which has been described and it similarly produces a voltage on an output line 108 that is proportional to the distance between the connected end of the resistance element 84 and the point of contact that is made by the actuator 94 associated with the other sash door in the track.

From the foregoing description, an improved sensing means for determining the position of sash doors is provided that offers advantages over the prior art. Even though one switching means 80 is provided for each track, the unique circuitry enables position indicating voltages for two sash doors that are moveable in a single set of tracks to be produced. The apparatus is simple to install and generates the signals utilizing a minimum of components which contributes to its extremely good cost effectiveness in terms of its manufacture.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. Apparatus for use in controlling the air flow through a fume hood to maintain a relatively constant average face velocity through an uncovered portion of an opening of a fume hood of the type which has at least one moveable sash door adapted to selectively cover the opening upon movement of the sash door, said apparatus being adapted to provide position indicating signals that are indicative of the absolute positions of said sash doors, said apparatus comprising:

an electrical switching means having an elongated electrical resistance means with a predetermined resistance value per unit length located adjacent and parallel to one direction of possible movement of at least one of the sash doors;

an actuator means associated with each one of the sash doors adapted to move when the sash door is moved, said actuator being positioned to operate said switching means at a single discrete switch location that varies along the length of the resistance means as the sash door is moved; and, circuit means adapted to provide a substantially constant electrical current through a portion of said resistance means between an end portion of said resistance means and the nearest switch location, said circuit means thereby providing a voltage signal having a magnitude that is proportional to the distance between said end portion of said resistance means and said switch location.

2. Apparatus as defined in claim 1 wherein said circuit means connects said resistance means to ground at each switch location.

3. Apparatus as defined in claim 1 wherein said electrical switching means comprises:

a first elongated thin base member to which said elongated electrical resistance means is applied said resistance means comprising a strip of resistive ink of known substantially constant resistance per unit length printed on said base member;

a second elongated thin base member located in generally overlying position relative to said first base member, said second member having a strip of conductive ink applied to said second member in close proximity to said strip of resistive ink;

said first and second members being attached to one another in close but spaced proximity by a pair of spaced beads of adhesive, said members being adapted to flex toward one another in response to said actuating means by a sufficient amount that said resistive ink contacts said conductive ink at said switch location.

4. Apparatus as defined in claim 3 wherein said electrical switching means has a length that at least corresponds with the length of travel of said sash door.

5. Apparatus as defined in claim 3 wherein the sash door is adapted to be vertically moved to uncover the opening, the electrical switching means being vertically oriented adjacent one side of the sash door, the sash door having said actuating means mounted thereto at a predetermined location, said electrical switching means extending at least from said actuating means when the sash door is generally completely closed to the elevation of said actuating means when the sash door is opened to substantially the full extent of its operating travel.

6. Apparatus as defined in claim 3 including a plurality of sash doors for covering the opening, including at least two sash doors being horizontally moveable in each of two sets of tracks, each of said sets of tracks having an electrical switching means, each of said sash doors having one of said actuating means, said circuit means being adapted to provide a generally constant electrical current from opposite ends of each said resistance means to a switch location of each sash door.

7. Apparatus as defined in claim 6 wherein said circuit means comprises current regulating means connected between a power supply means and said resistance means for providing a substantially constant current through said resistance means, notwithstanding the position of any of said switch locations along said resistance means.

8. Apparatus as defined in claim 7 wherein said voltage signal is produced between said current regulating means and the end of said resistance means to which said current regulating means is connected.

9. Apparatus as defined in claim 7 wherein said circuit means comprises current regulating means connected between a power supply means and each end of said resistance means for providing a substantially constant current through the portion of said resistance means that extends from each end to the nearest switch location, notwithstanding the position of one or more switch locations.

10. Apparatus as defined in claim 7 wherein said current regulating means comprises comparator means having one input connected to a reference voltage and another input connected to the emitter of a PNP transistor and to said power supply means through a resistor, the base of said transistor being connected to the output of the comparator means, and the collector of said transistor being connected to the resistance means.

11. Apparatus for use in controlling the air flow through a fume hood to maintain a relatively constant average face velocity through an uncovered portion of an opening of a fume hood of the type which has at least two moveable sash doors adapted to selectively cover the opening upon movement of the sash doors, said apparatus being adapted to provide position indicating signals that are indicative of the position of each of said sash doors, said apparatus comprising:
an electrical switching means having an elongated electrical resistance means with a predetermined resistance value per unit length located adjacent and parallel to one direction of possible movement of the sash doors, said switching means being adapted to be switched to ground at individual switch locations which can vary along its length;
an actuator means associated with each of the sash doors and adapted to move when the sash door is moved, each said actuator being positioned to operate said switching means at a single discrete switch location along the length of said electrical switching means; and,
circuit means adapted to provide a substantially constant electrical current through a portion of said resistance means between each end portion of said resistance means and the nearest switch location, said circuit means thereby providing a voltage signal at each said end portion having a magnitude that is proportional to the distance between said end portion of said resistance means and said nearest switch location.

12. Apparatus as defined in claim 11 wherein the fume hood is of the type which has a vertically moveable sash door and said electrical switching means is oriented vertically, said circuit means thereby providing a voltage signal that is proportional to the vertical position of the sash door.

13. Apparatus for use in controlling the air flow through a fume hood to maintain a relatively constant average face velocity through an uncovered portion of an opening of a fume hood of the type which has at least three sash doors that are at least horizontally moveable in adjacent and parallel sets of tracks, the sash doors being adapted to cover a substantial portion of the opening when the sash doors are selectively positioned along the parallel tracks, said apparatus being adapted to provide position indicating signals that are indicative of the horizontal position of each said sash door, said apparatus comprising:
an electrical switching means being associated with each set of tracks, each of said switching means having an elongated electrical resistance means with a predetermined resistance value per unit length located adjacent and parallel to each set of tracks, said switching means being adapted to be switched to ground at individual switch locations which can vary along its length;
an actuator means associated with each sash door and adapted to move when the sash door is moved, each said actuator being positioned to operate said switching means at a single discrete switch location; and,
circuit means associated with each switching means and adapted to provide a substantially constant electrical current through a portion of said resistance means between at least one end portion of said resistance means and the nearest switch location, said circuit means providing a voltage signal having a magnitude that is proportional to the distance between at least one of said end portions of said resistance means and the switch location nearest said end portion.

14. Apparatus as defined in claim 13 wherein two sash doors are moveable in one set of tracks, said circuit means providing a substantially constant electrical current through a portion of said resistance means between opposite end portions of said resistance means and the nearest switch location, said circuit means thereby providing voltage signals that are proportional to the distance between each end portion of said resistance means and the nearest switch location.

15. Apparatus as defined in claim 14 wherein the fume hood has at least four sash doors, two sash doors being moveable in each set of tracks, each of said circuit means providing a substantially constant electrical current through a portion of said resistance means between opposite end portions of said resistance means and the nearest switch location, said circuit means thereby providing voltage signals that are proportional to the distance between each end portion of said resistance means and the nearest switch location.

16. Apparatus as defined in claim 15 wherein one of said actuating means is attached to each sash door at a predetermined known position along its width.

17. Apparatus as defined in claim 15 wherein each of said sets of tracks are located in a common frame means, said frame means being vertically moveable relative to the opening of the fume hood.

* * * * *